US012657267B2

(12) United States Patent
Brookshire et al.

(10) Patent No.: US 12,657,267 B2
(45) Date of Patent: Jun. 16, 2026

(54) GAME-BASED USER BEHAVIORAL FINGERPRINT STEPPED-UP AUTHENTICATION

(71) Applicant: Wells Fargo Bank, N.A., San Francisco, CA (US)

(72) Inventors: Matthew S. Brookshire, Cottonwood Heights, UT (US); Christopher Gaston Seagram, Frisco, TX (US); Angela M. Sicord, San Francisco, CA (US); Matthew N. Wheeler, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 81 days.

(21) Appl. No.: 18/440,368

(22) Filed: Feb. 13, 2024

(65) Prior Publication Data

US 2025/0258897 A1 Aug. 14, 2025

(51) Int. Cl.
*G06F 21/00* (2013.01)
*A63F 13/71* (2014.01)
*G06F 21/31* (2013.01)

(52) U.S. Cl.
CPC ............ *G06F 21/316* (2013.01); *A63F 13/71* (2014.09)

(58) Field of Classification Search
CPC ............................... G06F 21/316; A63F 13/71
See application file for complete search history.

(56) References Cited

U.S. PATENT DOCUMENTS

| 4,805,222 | A | 2/1989 | Young et al. |
| 7,103,200 | B2 | 9/2006 | Hillhouse et al. |
| 8,539,550 | B1 | 9/2013 | Terres et al. |
| 8,913,028 | B2 | 12/2014 | Chin |
| 9,213,819 | B2 | 12/2015 | Grigg et al. |
| 10,252,170 | B2 | 4/2019 | Judkins et al. |
| 10,675,544 | B2 | 6/2020 | Stroud |
| 10,864,444 | B1 * | 12/2020 | Rao ......................... A63F 13/35 |

(Continued)

FOREIGN PATENT DOCUMENTS

JP          6928107          8/2021

*Primary Examiner* — William A Corum, Jr.
(74) *Attorney, Agent, or Firm* — SCHWEGMAN LUNDBERG & WOESSNER, P.A.

(57) ABSTRACT

A method may include receiving a login request from a computing device including authentication data for a user identifier; granting access to user identifier for a host application having a current level of authentication; receiving a request from the computing device to perform an action; determining the current level of authentication is less than an action level of authentication of the action; presenting a gaming application on the computing device embedded as part of the host application; monitoring telemetry data of the computing device during gameplay of the gaming application including: user interaction data associated with gaming application, and computing device movement data; calculating a current user behavior fingerprint using the telemetry data; calculating a fingerprint similarity score between the current user behavior fingerprint and a past user behavior fingerprint; determining the fingerprint similarity score is above a threshold similarity score; and based on the second determining, authorizing the action.

17 Claims, 5 Drawing Sheets

(56) References Cited

U.S. PATENT DOCUMENTS

| | | | |
|---|---|---|---|
| 10,915,904 B2 | 2/2021 | Conway | |
| 11,383,169 B1 | 7/2022 | Wakeford et al. | |
| 11,451,532 B2 * | 9/2022 | Arif Khan | G06N 20/10 |
| 11,580,202 B2 | 2/2023 | Benkreira et al. | |
| 2007/0236330 A1 * | 10/2007 | Cho | G06F 21/305 |
| | | | 340/5.54 |
| 2008/0092245 A1 | 4/2008 | Alward et al. | |
| 2010/0225443 A1 | 9/2010 | Bayram et al. | |
| 2014/0096196 A1 * | 4/2014 | O'Connor | G06F 21/36 |
| | | | 726/17 |
| 2017/0046508 A1 | 2/2017 | Shin et al. | |
| 2018/0165432 A1 * | 6/2018 | Cierna | H04L 63/0861 |
| 2020/0326823 A1 | 10/2020 | Duffield et al. | |
| 2021/0201362 A1 | 7/2021 | Stern et al. | |
| 2021/0312024 A1 * | 10/2021 | Gupta | H04M 1/72469 |
| 2023/0097716 A1 * | 3/2023 | McMullen, V | G06N 3/08 |
| | | | 463/29 |

* cited by examiner

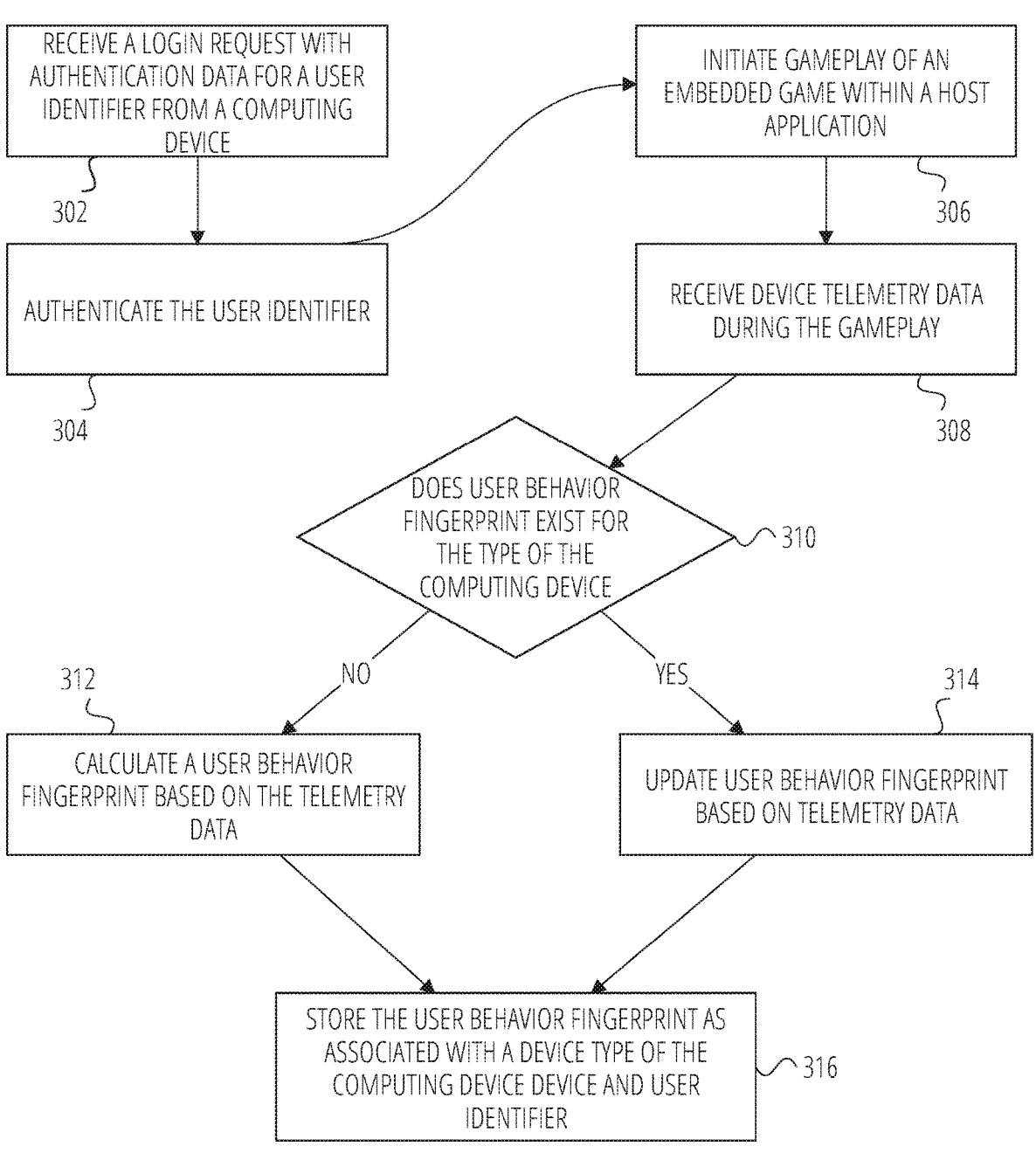

RECEIVE A LOGIN REQUEST WITH AUTHENTICATION DATA FOR A USER IDENTIFIER FROM A COMPUTING DEVICE

302

AUTHENTICATE THE USER IDENTIFIER

304

INITIATE GAMEPLAY OF AN EMBEDDED GAME WITHIN A HOST APPLICATION

306

RECEIVE DEVICE TELEMETRY DATA DURING THE GAMEPLAY

308

DOES USER BEHAVIOR FINGERPRINT EXIST FOR THE TYPE OF THE COMPUTING DEVICE

310

312

NO

CALCULATE A USER BEHAVIOR FINGERPRINT BASED ON THE TELEMETRY DATA

YES

314

UPDATE USER BEHAVIOR FINGERPRINT BASED ON TELEMETRY DATA

STORE THE USER BEHAVIOR FINGERPRINT AS ASSOCIATED WITH A DEVICE TYPE OF THE COMPUTING DEVICE DEVICE AND USER IDENTIFIER

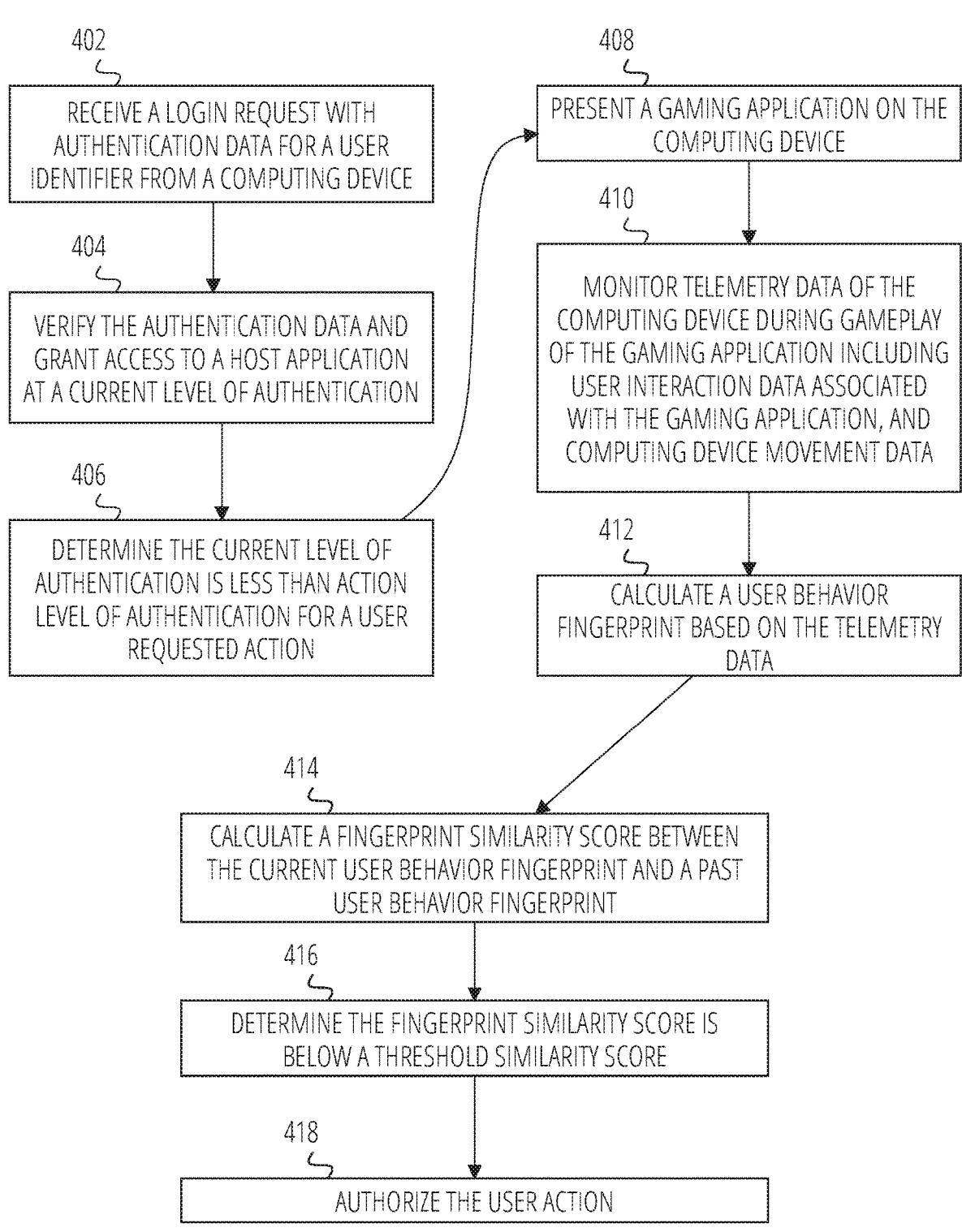

402

RECEIVE A LOGIN REQUEST WITH AUTHENTICATION DATA FOR A USER IDENTIFIER FROM A COMPUTING DEVICE

404

VERIFY THE AUTHENTICATION DATA AND GRANT ACCESS TO A HOST APPLICATION AT A CURRENT LEVEL OF AUTHENTICATION

406

DETERMINE THE CURRENT LEVEL OF AUTHENTICATION IS LESS THAN ACTION LEVEL OF AUTHENTICATION FOR A USER REQUESTED ACTION

408

PRESENT A GAMING APPLICATION ON THE COMPUTING DEVICE

410

MONITOR TELEMETRY DATA OF THE COMPUTING DEVICE DURING GAMEPLAY OF THE GAMING APPLICATION INCLUDING USER INTERACTION DATA ASSOCIATED WITH THE GAMING APPLICATION, AND COMPUTING DEVICE MOVEMENT DATA

412

CALCULATE A USER BEHAVIOR FINGERPRINT BASED ON THE TELEMETRY DATA

414

CALCULATE A FINGERPRINT SIMILARITY SCORE BETWEEN THE CURRENT USER BEHAVIOR FINGERPRINT AND A PAST USER BEHAVIOR FINGERPRINT

416

DETERMINE THE FINGERPRINT SIMILARITY SCORE IS BELOW A THRESHOLD SIMILARITY SCORE

418

AUTHORIZE THE USER ACTION

FIG. 4

GAME-BASED USER BEHAVIORAL FINGERPRINT STEPPED-UP AUTHENTICATION

BACKGROUND

Websites often require users to authenticate their identity before allowing access to sensitive account information or enabling certain transactions. This verification step aims to ensure the individual accessing the account is the genuine account holder. Common authentication methods include entering a password or code sent to the user's email or phone. However, these approaches are vulnerable to hacking, phishing, or social engineering attacks. More secure options involve multi-factor authentication which combines a password with a second step such as answering a secret question or inputting a one-time code from an authenticator app.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Like numerals having different letter suffixes may represent different instances of similar components.

FIG. 3 illustrates an aspect of the subject matter in accordance with one embodiment.

FIG. 4 illustrates an aspect of the subject matter in accordance with one embodiment.

DETAILED DESCRIPTION

Figure 1:
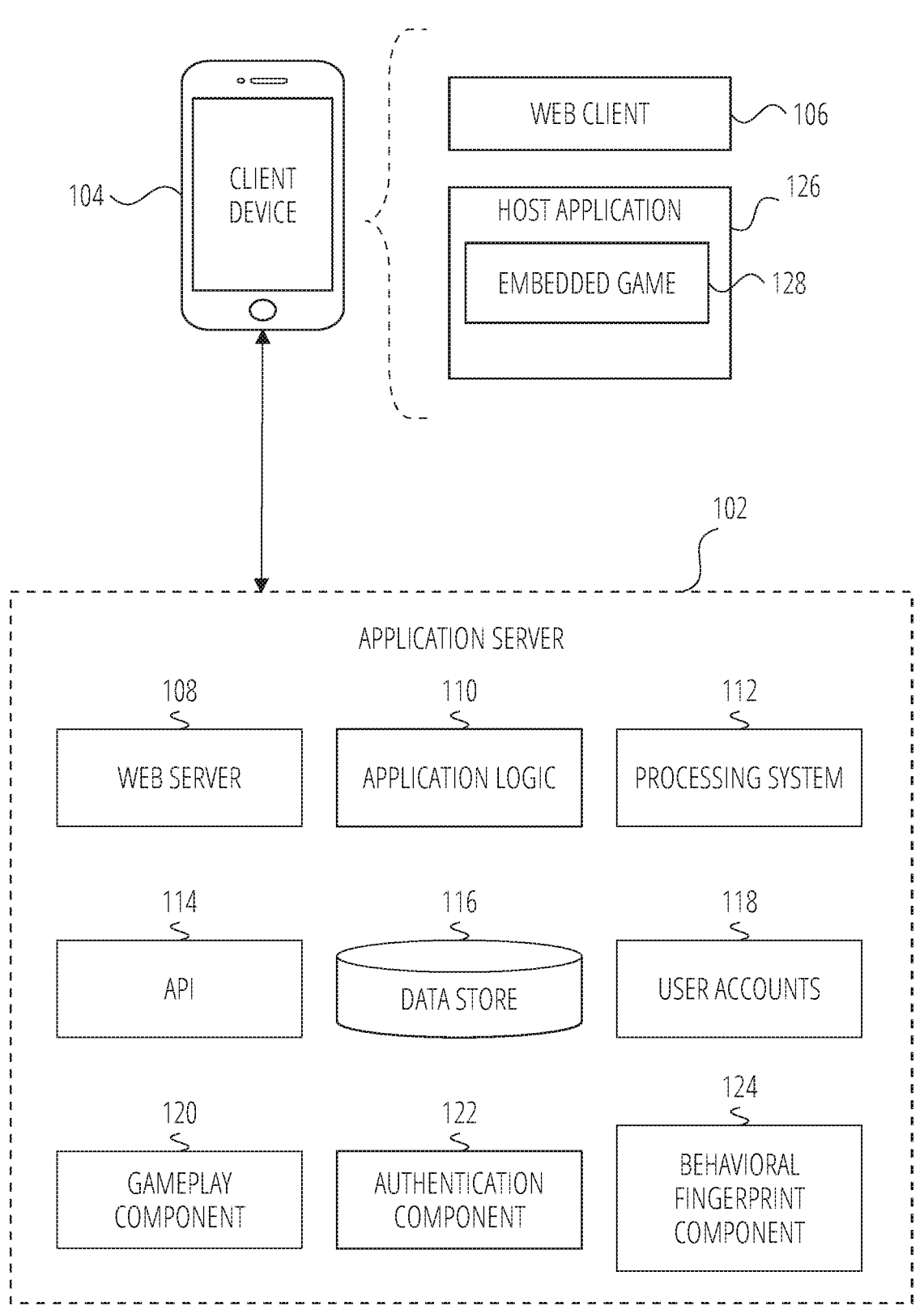
FIG. 1 is an illustration of components of a client device and an application server, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, components may perform electronic actions in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces are described as being presented to a computing device. The presentation may include data transmitted (e.g., a hypertext markup language file) from a first device (such as a web server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples, these portions may be displayed on a screen simultaneously, in others, the portions/elements may be displayed on separate screens such that not all portions/elements are displayed simultaneously. Unless explicitly indicated as such, the use of "presenting a user interface" does not infer either one of these options.

Additionally, the elements and portions are sometimes described as being configured for a particular purpose. For example, an input element may be configured to receive an input string. In this context, "configured to" may mean presenting a user interface element capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query to a database.

Existing systems for creating user behavior fingerprints face limitations in establishing unique user profiles. For example, creating a user behavior fingerprint with enough fidelity to distinguish one user from another may require capturing data from multiple user sessions before having enough signals to build a reliable fingerprint. This poses challenges for verifying identity for infrequent engagements such as once-a-month logins. Without more frequent interactions to reinforce the biometric patterns, the system may not reach adequate confidence levels.

Moreover, behavioral profiles created (and signals collected) on one device type, such as a mobile phone, may not transfer accurately to other form factors with different input mechanisms (e.g., desktop computers). The peripherals and mechanisms for interacting with touchscreens versus keyboards result in different user actions that diminish fingerprint match rates across platforms. This constrains the portability and consistency of existing biometric systems.

The methods in this disclosure alleviate the issues by using a specifically configured gameplay designed to elicit a variety of input signals tied to behavioral patterns, including but not limited to taps, swipes, scrolls, pinches, zooms, and typing. The gameplay may be part of a game and be embedded in a host application. For example, the host application may be a mobile application provided by a non-gaming company. Thus, the system and method described herein enable the creation of a user behavior fingerprint within a single session rather than relying upon gradual accumulation over time.

Furthermore, because a fingerprint may be calculated in a single session, the confidence of using a subsequent gameplay session for comparison is also increased. For example, as discussed, some user interaction sessions do not have enough data to generate a fingerprint. Thus, while a fingerprint may be calculated based on the limited interactions of the single session, the confidence of a match would be lower than if the session had more interactions. Accordingly, the systems and methods described herein may allow users to replay the game to confirm their identity even after logging in. Further authentication may be helpful when an increased level of authentication is needed for particular user actions. Further benefits of using an embedded game in a host application may be apparent to those having skill in the art upon reading this disclosure.

FIG. 1 illustrates the components of a client device and an application server according to various examples. FIG. 1 includes an application server 102, a client device 104, a web client 106, a web server 108, an application logic 110, a processing system 112, an API 114, a data store 116, a user accounts 118, a gameplay component 120, an authentication component 122, a behavioral fingerprint component 124, a host application 126, and an embedded game 128.

Application server 102 is illustrated as separate elements (e.g., components, logic). However, the functionality of multiple individual elements may be performed by a single element. An element may represent computer program code executable by processing system 112. The program code may be stored on a storage device (e.g., data store 116) and loaded into the memory of the processing system 112 for execution. Portions of the program code may be executed in parallel across multiple processing units. A processing unit may be one or more of the cores of a general-purpose computer processor, a graphical processing unit, an application-specific integrated circuit, or a tensor processing core operating on a single device or multiple devices. Accordingly, code execution using a "processing unit" may be performed on a single device or distributed across multiple devices. In some examples, using shared computing infrastructure, the program code may be executed on a cloud platform (e.g., MICROSOFT AZURE® and AMAZON EC2®).

Client device 104 may be a computing device which may be but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., specially configured user interfaces). In some embodiments, computing devices may comprise one or more of a touch screen, camera, keyboard, microphone, or Global Positioning System (GPS) device.

The client device 104 may be the interface for users to interact with the application server 102. For example, host application 126, which may be specialized software like a financial app, healthcare app, communications app, etc., designed to facilitate secure access to a company's services. Users may download the host application 126 from various platforms, depending on the client device's 104 operating system. For instance, if the client device is a smartphone running on ANDROID®, the host application can be downloaded from the GOOGLE PLAY STORE®. Alternatively, if the device is an iOS device, the application would be available on the APPLE APP STORE®.

The host application 126 may be structured into two segments: the base functionality and the embedded game 128. The host application 126 may include multiple embedded games. For example, different users may prefer different types of games (e.g., puzzle games, platform games). The base functionality may be responsible for standard operations, such as data retrieval and transaction requests performed through established communication protocols with the application server 102. For example, if the host application 126 is a healthcare-focused app, the base functionality may be used to retrieve test results.

The second segment, the embedded game 128, may be integrated into the host application 126 to generate a user's behavioral biometric fingerprint. Embedded game 128 may monitor interaction data during gameplay to construct a user behavior fingerprint. Both segments are designed to work together, with the embedded game 128 being invoked as needed based on specific user actions or authentication requirements dictated by application server 102. A more detailed description of a possible architecture of the embedded game 128 is presented in FIG. 2.

In various examples, the gameplay component 120 on the application server 102 may manage distribution and updates to the embedded games. The update process may be automatic or may prompt the user for authorization before updating. In examples where the host application 126 includes multiple embedded games, the gameplay component 120 may manage a repository of these games. A game selection interface may be presented on client device 104 via the host application 126. Gameplay component 120 may transmit the game logic of a selected game to the client device 104 for use as embedded game 128.

The gameplay component 120 may also suggest a game for a user based on device capabilities, user preferences, or the type of biometric data needed for authentication purposes. For example, if a device does not have a touchscreen, a different game may be suggested than a device with a touchscreen. In various examples, instead of a suggestion, a game is automatically selected and pushed to client device 104 based on the device's capabilities.

Client device 104 and application server 102 may communicate via a network (not shown). The network may include local-area networks (LAN), wide-area networks (WAN), wireless networks (e.g., 802.11 or cellular network), Public Switched Telephone Network (PSTN), ad hoc networks, cellular, personal area networks or peer-to-peer (e.g., Bluetooth®, Wi-Fi Direct), or other combinations or permutations of network protocols and network types. The network may include a single Local Area Network (LAN), Wide-Area Network (WAN), or combinations of LANs or WANs, such as the Internet.

In some examples, the communication may occur using an application programming interface (API) such as API 114. An API provides a method for computing processes to exchange data. A web-based API (e.g., API 114) may permit communications between two or more computing devices, such as a client and a server. The API may define a set of HTTP calls according to Representational State Transfer (RESTful) practices. For example, A RESTful API may define various GET, PUT, POST, and DELETE methods to create, replace, update, and delete data stored in a database (e.g., data store 116).

As an example, consider host application 126 is a financial application and a logged-in user requests a transfer of funds to an overseas account. The host application 126 may initiate a RESTful API call to API 114. This call may be structured as an HTTP POST request, which includes parameters such as the source account identifier, the destination overseas account details, the currency type, and the transfer amount. The request may also carry authentication headers to ensure the user is authorized to perform the transaction. As discussed in further detail below, authentication component 122 may ensure that the current level of authentication of the user identifier is high enough for the request before processing it.

Application server 102 may include web server 108 to enable data exchanges with client device 104 via web client 106 or host application 126. Although generally discussed in the context of delivering webpages via the Hypertext Transfer Protocol (HTTP), other network protocols may be utilized by web server 108 (e.g., File Transfer Protocol, Telnet, Secure Shell, etc.). Additionally, web server 108 may enable users to interact with one or more web applications provided in a transmitted web page or host application 126. A web application may provide user interface (UI) components rendered on a client device's 104 display device. The user may interact (e.g., select, move, enter text into) with the UI components, and, based on the interaction, the web application may update one or more portions of the web page. A web application may be executed in whole or in part locally on client device 104. The web application may populate the UI components with data from external or internal sources (e.g., data store 116) in various examples.

The web application may be executed according to application logic 110. Application logic 110 may use the various elements of application server 102 to implement the web application. For example, application logic 110 may issue API calls to retrieve or store data from data store 116 and transmit it for display on client device 104. Similarly, data entered by a user into a UI component may be transmitted using API 114 back to the web server. Application logic 110 may use other elements (e.g., gameplay component 120, authentication component 122, behavioral fingerprint component 124, etc.) of application server 102 to perform functionality associated with the web application as described further herein.

Data store 116 may store data that is used by application server 102. Data store 116 is depicted as a singular element but may be multiple data stores. The specific storage layout and model used by data store 116 may take several forms—indeed, a data store 116 may utilize multiple models. Data store 116 may be, but is not limited to, a relational database (e.g., SQL), a non-relational database (NoSQL), a flat-file database, an object model, a document details model, a graph database, shared ledger (e.g., blockchain), or a file system hierarchy. Data store 116 may store data on one or more storage devices (e.g., a hard disk, random access memory (RAM), etc.). The storage devices may be in standalone arrays, part of one or more servers, and located in one or more geographic areas.

The data in data store 116 may be organized into data structures. Data structures may be implemented in several manners depending on the programming language of an application or database management system used by an application. For example, if C++ is used, the data structure may be implemented as a struct or class. In the context of a relational database, a data structure may be defined in a schema.

User accounts 118 may include user profiles on users of application server 102. A user profile may include credential information such as a username and hash of a password. A user may enter their username and plaintext password to a login page of application server 102 to view their user profile information or interfaces presented by application server 102 in various examples.

A user account may also identify computing devices associated with the user. For example, users may register one or more phones, desktop computers, tablets, or laptops with application server 102. Registering may include authorizing application server 102 to retrieve data from these devices, such as location data, browser history, etc. Users may revoke access to any such data at any time by updating their profile. The data may be gathered via an application installed on one of the registered devices, such as by downloading an application from an app store associated with their mobile phone platform. The data may also include device capabilities. For example, the data may indicate whether the computing device has a touchscreen, microphone, physical keyboard, etc.

"Associated" in the context of linking an account to a user profile (or other data linkages described herein) may be implemented differently depending on the underlying database system. For example, in a relational database management system (RDBMS), "associated" may refer to the relationship between tables. The relationship could be one-to-one, one-to-many, or many-to-many, established through foreign key constraints. For example, in a one-to-many relationship, a record in Table A (e.g., the user profile table) may be associated with multiple records in Table B (e.g., a computing device table), using a foreign key in Table B that references the primary key in Table A.

The authentication component 122 within the application server 102 may manage the authorization of users based on the authentication method employed. In various examples, the authentication component 122 operates on a tiered authentication model, where different levels of access and privileges are granted depending on the robustness of the authentication method used, risk factors (e.g., if the user is logging in from a new location), etc. The tiers and factors described below are examples, and other criteria and more or fewer tiers may be used.

For example, a user logging in with a username and password may be a first-tier authorization (e.g., the lowest). This level of authentication may be sufficient for general access to the system such as viewing account balances or transaction histories. When a user employs biometric authentication, such as a fingerprint or facial recognition, the authentication component 122 elevates the user to a second tier. The second tier may allow for more sensitive transactions, such as initiating payments or changing account settings. The third tier may be required for the most critical transactions, such as transferring large sums of money or modifying sensitive personal information.

In various examples, the authentication component 122 is configured to dynamically adjust the level of authentication based on the authentication factors, changes in user location, and changes in user behavior. Thus, the authentication component 122 may ensure that each transaction is matched with an appropriate level of security, minimizing the risk of unauthorized access. A user may be moved to a higher tier of authentication by playing the embedded game 128.

In various examples, the behavioral fingerprint component 124 is configured to generate a user behavior fingerprint based on user actions. The user actions may be based on telemetry data gathered during the embedded game 128 gameplay or data collected when the user interacts with the host application 126. As the user plays the game, their interactions with the game—such as swipes, taps, typing speed, and the pressure applied to the touch screen—are recorded as telemetry data.

The behavioral fingerprint component 124 may analyze the telemetry data to identify unique patterns in the user's behavior. For instance, the component may analyze the average swipe speed, tap force, typing rhythm, and how the user holds and rotates the device. These metrics indicate the user's physical and cognitive interaction patterns with the device. The behavioral fingerprint component 124 may create the user behavior fingerprint-a digital representation of the user's unique interaction patterns. The user behavior fingerprint is then stored securely in the data store 116, associated with the user's account.

Figure 2:
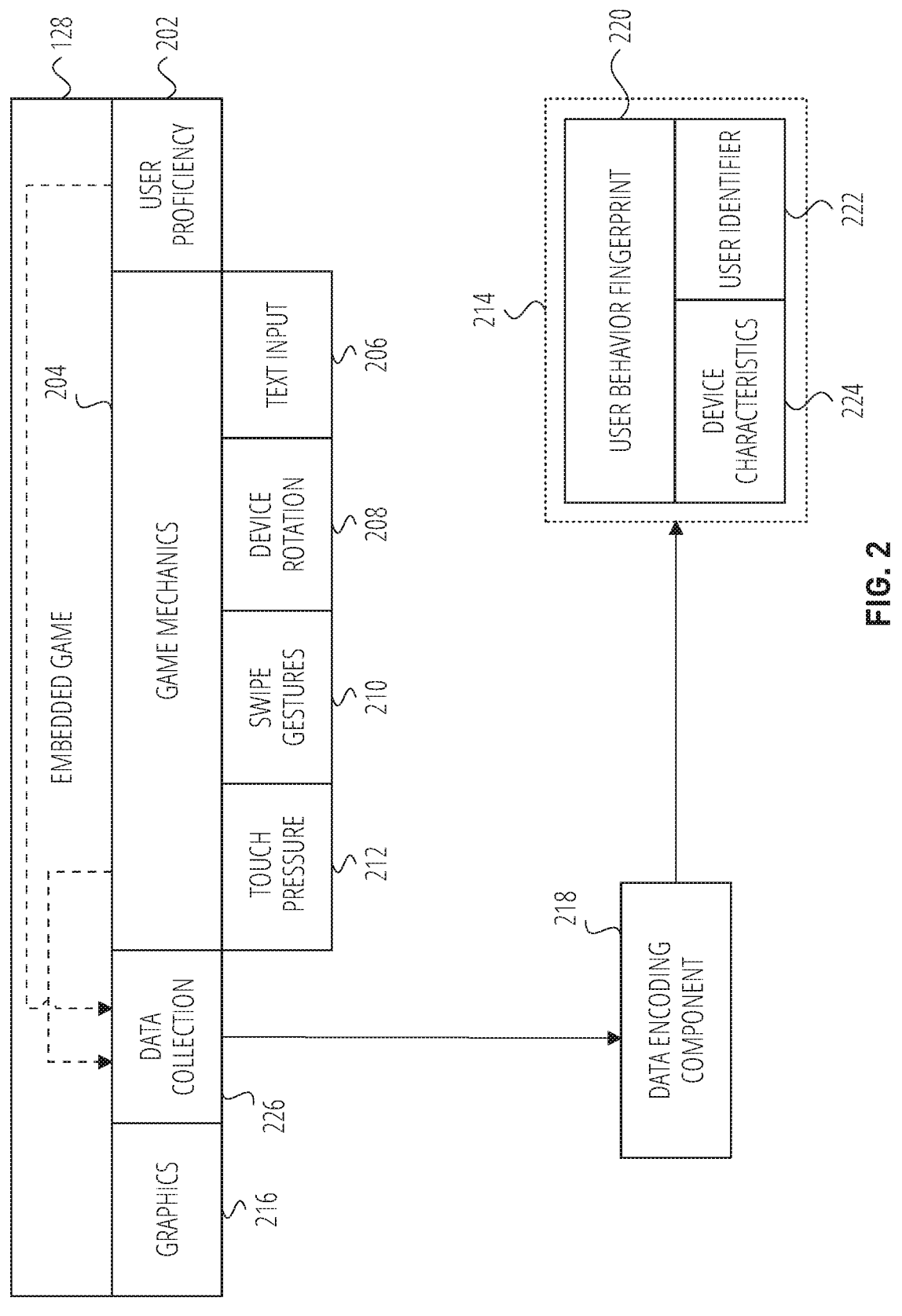
FIG. 2 is a schematic diagram of the components used to generate a fingerprint data structure, according to various examples

In future sessions, when the user attempts to perform a transaction that requires a higher level of authentication than the current level of authentication, the behavioral fingerprint component 124 may compare telemetry data collected during a new gameplay session against the stored user behavior fingerprint. If the current telemetry data patterns match the stored fingerprint, the user may authenticate to a higher authentication level, thereby authorizing the transaction. FIG. 2 includes a more detailed explanation of generating a user behavior fingerprint.

FIG. 2 is a schematic diagram of the components that generate a fingerprint data structure 214, according to various examples. FIG. 2 illustrates an embedded game 128 (such as the one in FIG. 1), user proficiency 202, game mechanics 204, data collection 226, and graphics 216. The game mechanics 204 may include touch pressure 212, swipe gestures 210, device rotation 208, and text input 206. FIG. 2 further includes data encoding component 218 and fingerprint data structure 214, which includes user behavior fingerprint 220, device characteristics 224, and user identifier 222.

In various examples, embedded game 128 is engineered to elicit user behavior that maps to the components of a user behavior fingerprint. For example, a user behavior fingerprint may be calculated according to touch pressure, swipe gesture speed, device rotation speed, and typing speed characteristics. Accordingly, the game mechanics 204 may include actions that require a user to use touch pressure 212, swipe gestures 210, device rotation 208, and text input 206.

Graphics 216 may include the animation models, textures, etc., rendered on a device such as client device 104. Game mechanics 204 may include the logic of presenting the graphics 216 in gameplay form. For example, game mechanics 204 may include logic for car racing or platform jumping games. In various examples, game mechanics 204 are configured such that the game may be completed in a few minutes but still uses at least one of each of the types of interactions used to generate a user behavior fingerprint.

User proficiency 202 may be a value that represents how well a user completed embedded game 128. For example, if the embedded game 128 is a timed game (e.g., the user has two minutes to complete a level), the value may be how many points the user accumulated. In another example, the value may be how quickly (e.g., in seconds) it took for a user to complete a level of embedded game 128.

Data collection 226 may collect and normalize telemetry data associated with game mechanics 204 and user proficiency 202 during gameplay. For example, typing speed may be measured in characters per minute, and touch pressure may be recorded in terms of the force applied. Similarly, device rotation speed may be measured in degrees per second, and swipe characteristics may be quantified in terms of length (in pixels or screen percentage), duration (in milliseconds), and pressure (using the touch sensor of the used computing device's force readings).

Data collection 226 may then extract features from the normalized telemetry data. This may include calculating averages, peak values, patterns, and deviations in the collected telemetry data. In another example data collection 226 may identify patterns in typing (like consistent speeds or frequent errors), recognizing unique swipe styles (like curved swipes or sharp directional changes), etc.

Data encoding component 218 may receive the normalized data from data collection 226 and generate a fingerprint data structure 214. In various examples, data encoding component 218 is part of a behavioral fingerprint component 124. As part of generating the fingerprint data structure 214, a user behavior fingerprint 220 may be generated. The user behavior fingerprint 220 may be a vectorized version of normalized data. For example, each vector element may represent a specific aspect of the user's behavior during gameplay, such as average typing speed, typical swipe length, or common rotation angle.

The device characteristics 224 may include data on the computing device used to play the embedded game 128. For example, the device characteristics 224 may indicate whether the computing device had a touchscreen, was a mobile phone, etc. The device characteristics 224 may encoded as a vector where each element of the vector represents a device characteristic, and a '0' indicates the computing device does not have the characteristic. An element of the vector may also include a device type identifier.

The user behavior fingerprint 220 may also include a user identifier 222 of the user that played the embedded game 128. The fingerprint data structure 214 may then be stored in data store 116.

FIG. 3 is a flowchart illustrating a method to generate a user behavior fingerprint. The method is represented as a set of blocks that describe operations 302 to 316. The method may be embodied in a set of instructions stored in at least one computer-readable storage device of a computing device. A computer-readable storage device excludes transitory signals. In contrast, a signal-bearing medium may include such transitory signals. A machine-readable medium may be a computer-readable storage device or a signal-bearing medium. A processing unit, which executes the set of instructions, may configure the processing unit to perform the operations illustrated in FIG. 3. The processing unit may instruct other components of a computing device to carry out the set of instructions. For example, the processing unit may instruct a network device to transmit data to another computing device, or the computing device may provide data over a display interface to present a user interface. In some examples, the method's performance may be split across multiple computing devices using a shared computing infrastructure (e.g., the processing unit encompasses multiple distributed computing devices).

According to various examples, the method includes receiving a login request with authentication data for a user identifier from a computing device at operation 302. The operation may include the initial interaction between the user and application server 102 using the host application 126. The login request is transmitted over a network and may be facilitated by a network interface device that routes the request to the appropriate destination within the server infrastructure (e.g., by application logic 110). The user identifier accompanying the request may be user-specific and may include identifiers such as a username or an email address. The authentication data may be a hash of a password.

According to various examples, the method includes authenticating the user identifier at operation 304. For example, authentication component 122 may compare the received authentication data against the secure credentials stored within the data store for the user identifier. If the authentication data aligns with the stored credentials, the user may be deemed authenticated and establish a session with application server 102 via host application 126.

According to various examples, the method includes initiating gameplay of an embedded game within a host application at operation 306. The user may select a game to play from a presented list within host application 126. A message may accompany the presented list that indicates to the user that by playing the game, a user behavior fingerprint may be generated to provide increased security for the user's account. According to various examples, the method includes receiving device telemetry data during the gameplay at operation 308, such as described in data collection 226 of FIG. 2.

According to various examples, the method includes determining if a user behavior fingerprint exists for the type of the computing device at decision operation 310. The determining may include querying data store 116 for a fingerprint data structure 214 with device characteristics 224 that match device characteristics of the computing device used during gameplay. In various examples, it is a match if a device type element of the device characteristics 224 matches the device type of the computing device used during gameplay. It may also be considered a match if specific (or a threshold number) device characteristics match. For example, if both computing devices have touchscreens and have gyroscope sensors to measure rotation speed, it may be considered a match.

According to various examples, if decision operation 310 is no, the method includes calculating a user behavior fingerprint based on the telemetry data at operation 312. The user behavior fingerprint may be generated as described in FIG. 2.

According to various examples, if decision operation 310 is yes, the method includes updating the user behavior fingerprint based on telemetry data at operation 314. Updating may include adding telemetry data collected from gameplay to the existing averages for the interaction types (e.g., touch pressure, text input speeds). According to various examples, the method includes storing the user behavior fingerprint as associated with a type of computing device and user identifier at operation 316. Storing may include storing the updated user behavior fingerprint or a new user behavior fingerprint, depending on the outcome of decision operation 310.

FIG. 4 is a flowchart illustrating a method for stepping up a user's level of authentication. The method is represented as a set of blocks that describe operations 402-418. The method may be embodied in a set of instructions stored in at least one computer-readable storage device of a computing device. A computer-readable storage device excludes transitory signals. In contrast, a signal-bearing medium may include such transitory signals. A machine-readable medium may be a computer-readable storage device or a signal-bearing medium. A processing unit, which executes the set of instructions, may configure the processing unit to perform the operations illustrated in FIG. 4. The processing unit may instruct other components of a computing device to carry out the set of instructions. For example, the processing unit may instruct a network device to transmit data to another computing device, or the computing device may provide data over a display interface to present a user interface. In some examples, performance of the method may be split across multiple computing devices using a shared computing infrastructure (e.g., the processing unit encompasses multiple distributed computing devices).

According to various examples, the method includes receiving a login request with authentication data for a user identifier from a computing device at operation 402. Operation 402 may be performed similarly as described for operation 302 in FIG. 3. For example, a user may enter their username and password on the login screen presented on host application 126.

According to various examples, the method includes verifying the authentication data and granting access to a host application at a current level of authentication at operation 404. For example, the authentication data may be verified as described in operation 304 of FIG. 3. Additionally, a level of authentication may be determined based on how the user was authenticated as described with respect to authentication component 122 in FIG. 1.

According to various examples, the method includes determining whether the current level of authentication is less than the action level of authentication for a user requested action at operation 406. For example, a user may attempt to access specific data, transfer certain funds, etc., in the host application 126. The authentication component 122 may access (e.g., query a database) the action level of authentication for the action and compare it to the current level of authentication of the user.

According to various examples, the method includes presenting a gaming application on the computing device at operation 408. For example, a message may be presented to the user via the host application 126 that the user has not been sufficiently authenticated to perform the request action but that their authentication level may be increased by playing an embedded game. In various examples, a prompt may be presented to select a game of a plurality of embedded games.

According to various examples, the method includes monitoring telemetry data of the computing device during gameplay of the gaming application, including user interaction data associated with the gaming application and computing device movement data at operation 410. Monitoring may include collecting telemetry data via data collection 226. The user interaction data may be data such as typing speed and gesture speed, and computing device movement data may be the rotation speed of the device based on sensor data (e.g., a gyroscope).

According to various examples, the method includes calculating a user behavior fingerprint based on the telemetry data at operation 412. The calculation may be made using behavioral fingerprint component 124 and implemented as described in FIG. 2.

According to various examples, the method includes calculating a fingerprint similarity score between the current user behavior fingerprint and a past user behavior fingerprint at operation 414. For example, the past user behavior fingerprint may be based on a plurality of user interaction types wherein the gaming application is configured to produce interaction scenarios that solicit user interaction types corresponding to the plurality of user interaction types.

Additionally, the past user behavior fingerprint may be selected from a plurality of past user behavior fingerprints of the user identifier using the following process. A database may be queried for device characteristics of the current computing device (e.g., the one that transmitted the login request). In another example, the device characteristics are requested from the computing device. The device characteristics may include the computing device's make and model, operating system, hardware specifications, presence of specific sensors, and other unique identifiers.

A database (e.g., data store 116) may then be queried to retrieve device characteristics of a past computing device associated with the user identifier that has a user behavior fingerprint. The device characteristics may be part of a stored fingerprint data structure 214. A device similarity score may be calculated between the device characteristics of the current computing device and the device characteristics of the past computing device.

The device similarity score may be calculated in several manners, such as described in decision operation 310 for determining device type. For example, a device similarity score of '1' may be used if the make and model of the current computing device and past computing device are the same. In other examples, if specific device characteristics are matched (e.g., if both have a touch screen) but are different makes and models, a similarity score of less than '1' may result. Another device similarity score method may count the shared device characteristics between the current and past computing devices. Suppose the device similarity score is within a threshold range (e.g., within 0.1). In that case, the device similarity score is within a threshold range (e.g., within 0.1), and the user behavior fingerprint associated with the past computing device may be used as the fingerprint comparison for operation 414.

As discussed previously, a user behavior fingerprint may be a vector. The vector may be considered a vector in a multi-dimensional space, where each dimension corresponds to a different type of telemetry data (like average typing speed, average swipe length, etc.). Accordingly, calculating a fingerprint similarity score may include calculating a similarity or distance between these two vectors. One method is to use the cosine similarity measure, which calculates the cosine of the angle between the two vectors. Euclidean distance may be used in another method, which computes the "straight line" distance between the two points in multi-dimensional space.

According to various examples, the method includes determining whether the fingerprint similarity score is above a threshold similarity score at operation 416. For example, a threshold may be set where a similarity score above a certain level indicates a match. This comparison may yield a quantitative assessment of how similar two users are based on their interaction patterns (e.g., the telemetry data) with the embedded game.

According to various examples, the method authorizes the user action at operation 418 based on operation 416. For example, upon determining the fingerprint similarity score is above the threshold, the current level of authentication may be increased to the action level of authentication. Additionally, a message may be transmitted for display on the computing device used to play the embedded game that the user action was completed.

Figure 5:
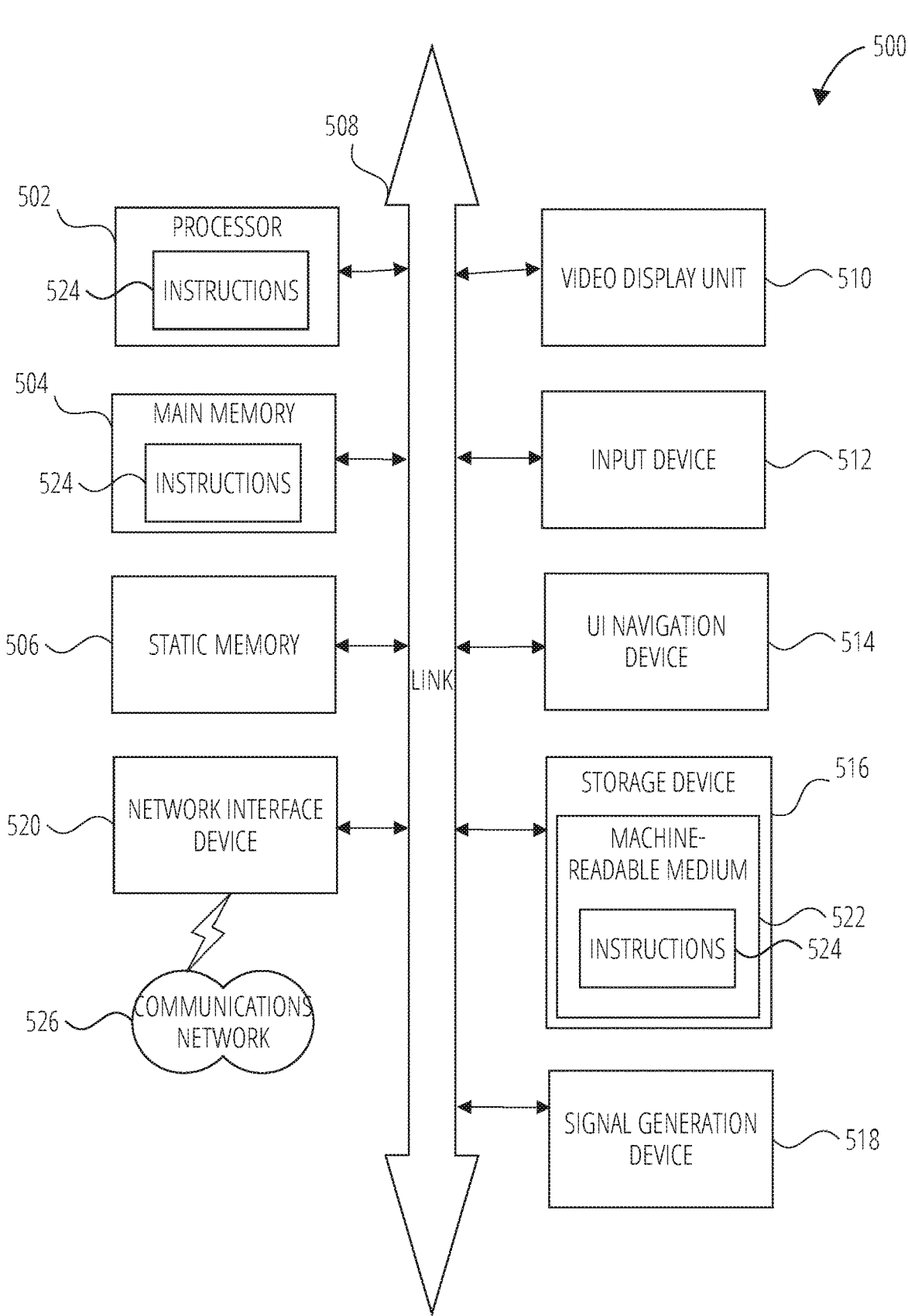
FIG. 5 is a block diagram illustrating a machine in the example form of computer system 500, within which a set or sequence of instructions may be executed to cause the machine to perform any one of the methodologies discussed herein, according to various examples.

FIG. 5 is a block diagram illustrating a machine in the example form of computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508. The computer system 500 may further include a video display unit 510, an input device 512 (e.g., a keyboard), and a user interface UI navigation device 514 (e.g., a mouse). In one embodiment, the video display unit 510, input device 512, and UI navigation device 514 are incorporated into a single device housing such as a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensors.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed Database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 522 that excluded transitory signals.

The instructions 524 may further be transmitted or received over a communications network 526 using a transmission medium via the network interface device 520 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A computer-implemented method comprising:

receiving, using a processing unit, a login request from a computing device, the login request including authentication data for a user identifier;

based on verification of the authentication data, granting access, using the processing unit, to user identifier for a host application, the access having a current level of authentication, the host application structured to include base functionality and an embedded gaming application portion;

subsequent to the verification, receiving, using the processing unit, a request from the computing device to perform an action within the host application;

first determining, using the processing unit, the current level of authentication is less than an action level of authentication of the action;

based on the first determining, presenting, using the processing unit, the gaming application on the computing device, the gaming application executed within and invoked by the host application without navigating away from the host application and specifically configured to produce interaction scenarios that solicit user interaction types mapped to user interaction types used in a user behavior fingerprint;

monitoring, using the processing unit, telemetry data of the computing device during gameplay of the gaming application, the telemetry data including: user interaction data associated with the gaming application, and computing device movement data, the user interaction data including the user interaction types;

calculating, using the processing unit, a current user behavior fingerprint using the telemetry data;

calculating, using the processing unit, a fingerprint similarity score between the current user behavior fingerprint and a past user behavior fingerprint;

second determining, using the processing unit, the fingerprint similarity score is above a threshold similarity score; and based on the second determining, authorizing, using the processing unit, the action.

2. The computer-implemented method of claim 1, further comprising:

selecting the past user behavior fingerprint from a plurality of past user behavior fingerprints of the user identifier.

3. The computer-implemented method of claim 2, wherein the computing device is a current computing device and wherein selecting the past user behavior fingerprint from the plurality of past user behavior fingerprints of the user identifier includes:

querying a database for device characteristics of the current computing device;

querying the database for device characteristics of a past computing device of the user identifier;

calculating a device similarity score, using the processing unit, between the device characteristics of the current computing device and the device characteristics of the past computing device; and determining the device similarity score is within a threshold range.

4. The computer-implemented method of claim 3, wherein the device characteristics include a touchscreen characteristic.

5. The computer-implemented method of claim 1, further comprising:

receiving from the computing device, using the processing unit, a selection of the gaming application from a plurality of gaming applications.

6. The computer-implemented method of claim 1, wherein the user interaction data includes a typing speed.

7. The computer-implemented method of claim 1, wherein the computing device movement data includes gyroscope sensor data.

8. A non-transitory computer-readable medium comprising instructions, which when executed by a processing unit, configure the processing unit to perform operations comprising:

receiving a login request from a computing device, the login request including authentication data for a user identifier;

based on verification of the authentication data, granting access to user identifier for a host application, the access having a current level of authentication, the host application structured to include base functionality and an embedded gaming application portion;

subsequent to the verification, receiving a request from the computing device to perform an action within the host application;

first determining the current level of authentication is less than an action level of authentication of the action;

based on the first determining, presenting the gaming application on the computing device, the gaming application executed within and invoked by the host application without navigating away from the host application and specifically configured to produce interaction scenarios that solicit user interaction types mapped to user interaction types used in a user behavior fingerprint;

monitoring telemetry data of the computing device during gameplay of the gaming application, the telemetry data including: user interaction data associated with the gaming application, and computing device movement data, the user interaction data including the user interaction types;

calculating a current user behavior fingerprint using the telemetry data;

calculating a fingerprint similarity score between the current user behavior fingerprint and a past user behavior fingerprint;

second determining the fingerprint similarity score is above a threshold similarity score; and based on the second determining, authorizing the action.

9. The non-transitory computer-readable medium of claim 8, wherein the instructions, which when executed by the processing unit, further configure the processing unit to perform operations comprising:

selecting the past user behavior fingerprint from a plurality of past user behavior fingerprints of the user identifier.

10. The non-transitory computer-readable medium of claim 9, wherein the computing device is a current computing device and wherein selecting the past user behavior fingerprint from the plurality of past user behavior fingerprints of the user identifier includes:

querying a database for device characteristics of the current computing device;

querying the database for device characteristics of a past computing device of the user identifier;

calculating a device similarity score between the device characteristics of the current computing device and the device characteristics of the past computing device; and determining the device similarity score is within a threshold range.

11. The non-transitory computer-readable medium of claim 10, wherein the device characteristics include a touchscreen characteristic.

12. The non-transitory computer-readable medium of claim 8, wherein the instructions, which when executed by the processing unit, further configure the processing unit to perform operations comprising:

receiving from the computing device a selection of the gaming application from a plurality of gaming applications.

13. The non-transitory computer-readable medium of claim 8, wherein the user interaction data includes a typing speed.

14. The non-transitory computer-readable medium of claim 8, wherein the computing device movement data includes gyroscope sensor data.

15. A system comprising:

a processing unit;

a storage device, comprising instructions, which when executed by the processing unit, configure processing unit to perform operations comprising:

receiving a login request from a computing device, the login request including authentication data for a user identifier;

based on verification of the authentication data, granting access to user identifier for a host application, the access having a current level of authentication, the host application structured to include base functionality and an embedded gaming application portion;

subsequent to the verification, receiving a request from the computing device to perform an action within the host application;

first determining the current level of authentication is less than an action level of authentication of the action;

based on the first determining, presenting the gaming application on the computing device, the gaming application executed within and invoked by the host application without navigating away from the host application and specifically configured to produce interaction scenarios that solicit user interaction types mapped to user interaction types used in a user behavior fingerprint;

monitoring telemetry data of the computing device during gameplay of the gaming application, the telemetry data including: user interaction data associated with the gaming application, and computing device movement data, the user interaction data including the user interaction types;

calculating a current user behavior fingerprint using the telemetry data;

calculating a fingerprint similarity score between the current user behavior fingerprint and a past user behavior fingerprint;

second determining the fingerprint similarity score is above a threshold similarity score; and based on the second determining, authorizing the action.

16. The system of claim 15, wherein the instructions, which when executed by the processing unit, further configure the processing unit to perform operations comprising:

selecting the past user behavior fingerprint from a plurality of past user behavior fingerprints of the user identifier.

17. The system of claim 16, wherein the computing device is a current computing device and wherein selecting the past user behavior fingerprint from the plurality of past user behavior fingerprints of the user identifier includes:

querying a database for device characteristics of the current computing device;

querying the database for device characteristics of a past computing device of the user identifier;

calculating a device similarity score between the device characteristics of the current computing device and the device characteristics of the past computing device; and determining the device similarity score is within a threshold range.

* * * * *